US009972155B2

(12) United States Patent
Kondo et al.

(10) Patent No.: US 9,972,155 B2
(45) Date of Patent: May 15, 2018

(54) COIN PROCESSING DEVICE

(71) Applicant: NIPPON CONLUX CO., LTD., Sakado-shi (JP)

(72) Inventors: Masashi Kondo, Sakado (JP); Ryoji Katagiri, Sakado (JP); Naoki Katagiri, Sakado (JP); Masaaki Yamaki, Sakado (JP)

(73) Assignee: NIPPON CONLUX CO., LTD., Sakado-shi (JP)

( * ) Notice: Subject to any disclaimer, the term of this patent is extended or adjusted under 35 U.S.C. 154(b) by 0 days. days.

(21) Appl. No.: 15/508,001

(22) PCT Filed: Dec. 12, 2014

(86) PCT No.: PCT/JP2014/083021
§ 371 (c)(1),
(2) Date: Mar. 1, 2017

(87) PCT Pub. No.: WO2016/035222
PCT Pub. Date: Mar. 10, 2016

(65) Prior Publication Data
US 2017/0309102 A1 Oct. 26, 2017

(30) Foreign Application Priority Data

Sep. 3, 2014 (JP) ................................ 2014-179320

(51) Int. Cl.
*G07D 1/02* (2006.01)
*G07D 1/06* (2006.01)
(Continued)

(52) U.S. Cl.
CPC ................. *G07D 1/02* (2013.01); *G07D 1/06* (2013.01); *G07D 3/16* (2013.01); *G05B 13/021* (2013.01)

(58) Field of Classification Search
CPC ... G07D 1/02; G07D 1/06; G07D 3/16; G05B 13/021
See application file for complete search history.

(56) References Cited

U.S. PATENT DOCUMENTS

| 2,435,371 | A | * | 2/1948 | Stout | G07D 1/02 |
|           |   |   |        |       | 220/4.01 |
| 4,367,760 | A | * | 1/1983 | Thomas | G07D 1/00 |
|           |   |   |        |       | 453/41 |
| 7,014,554 | B1 | * | 3/2006 | Fletcher | G07F 5/24 |
|           |   |   |        |       | 194/217 |

FOREIGN PATENT DOCUMENTS

| JP | 62-256191 A | 11/1987 |
| JP | 7-262426 A | 10/1995 |

(Continued)

OTHER PUBLICATIONS

International Search Report dated Jan. 20, 2015, in PCT/JP2014/083021 filed Dec. 12, 2014, (1 page).

*Primary Examiner* — Mark J Beauchaine
(74) *Attorney, Agent, or Firm* — Oblon, McClelland, Maier & Neustadt, L.L.P.

(57) ABSTRACT

A coin processing device includes a coin identification mechanism, a coin distribution mechanism, a plurality of coin tubes, and a coin delivery mechanism that delivers coins housed in the coin tubes by delivering operation of pulling out the coins using a payout slide. For a specific denomination, a two-coin delivering coin tube and one-coin delivering coin tubes are provided. Location information configured of variables indicating records of payment, distribution, and delivery is used to determine the coin tube when the coin distribution mechanism distributes coins of the specific denomination and to determine the coin tube when the coin delivery mechanism delivers the coins of the (Continued)

specific denomination. The coin processing device can increase speed in a process of delivering coins.

6 Claims, 14 Drawing Sheets

(51) Int. Cl.
*G07D 3/16* (2006.01)
*G05B 13/02* (2006.01)

(56) References Cited

FOREIGN PATENT DOCUMENTS

| JP | 10-198835 A | 7/1998 |
|----|-------------|--------|
| JP | 2013-37424 A | 2/2013 |

* cited by examiner

[Fig.1]
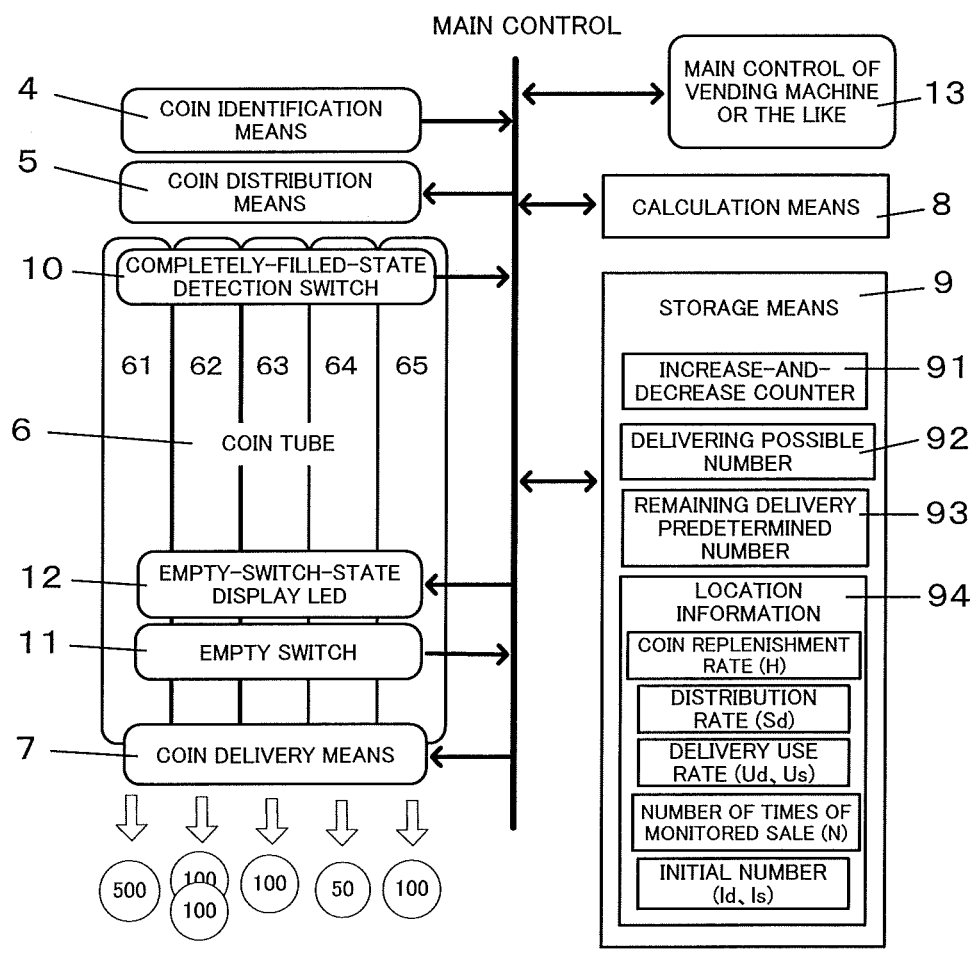

[Fig.2]
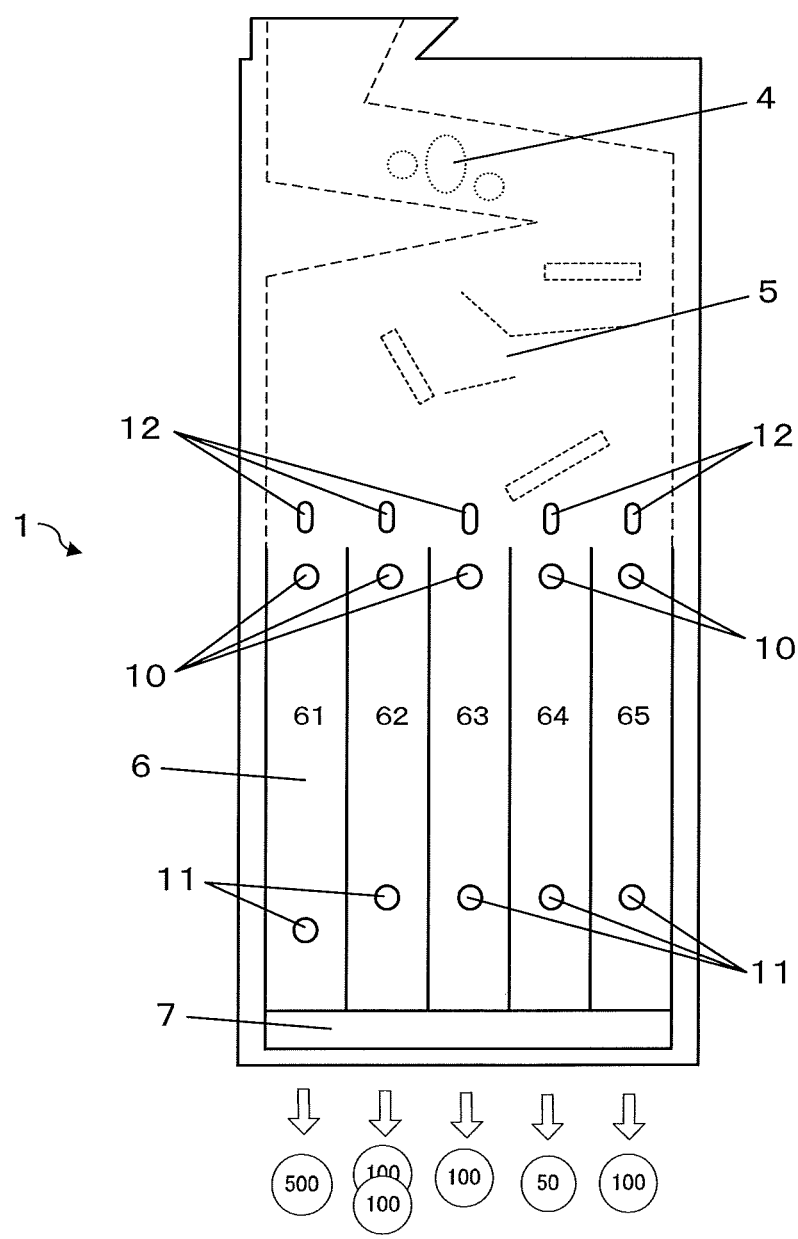

[Fig.3]
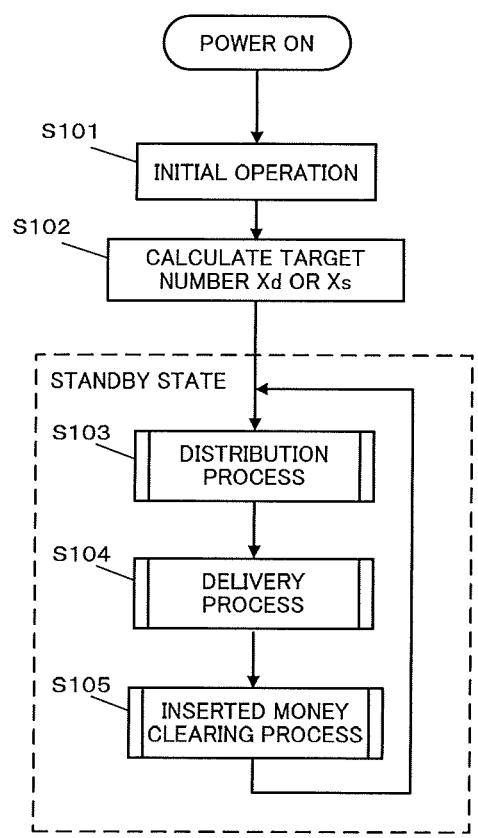

[Fig.4]
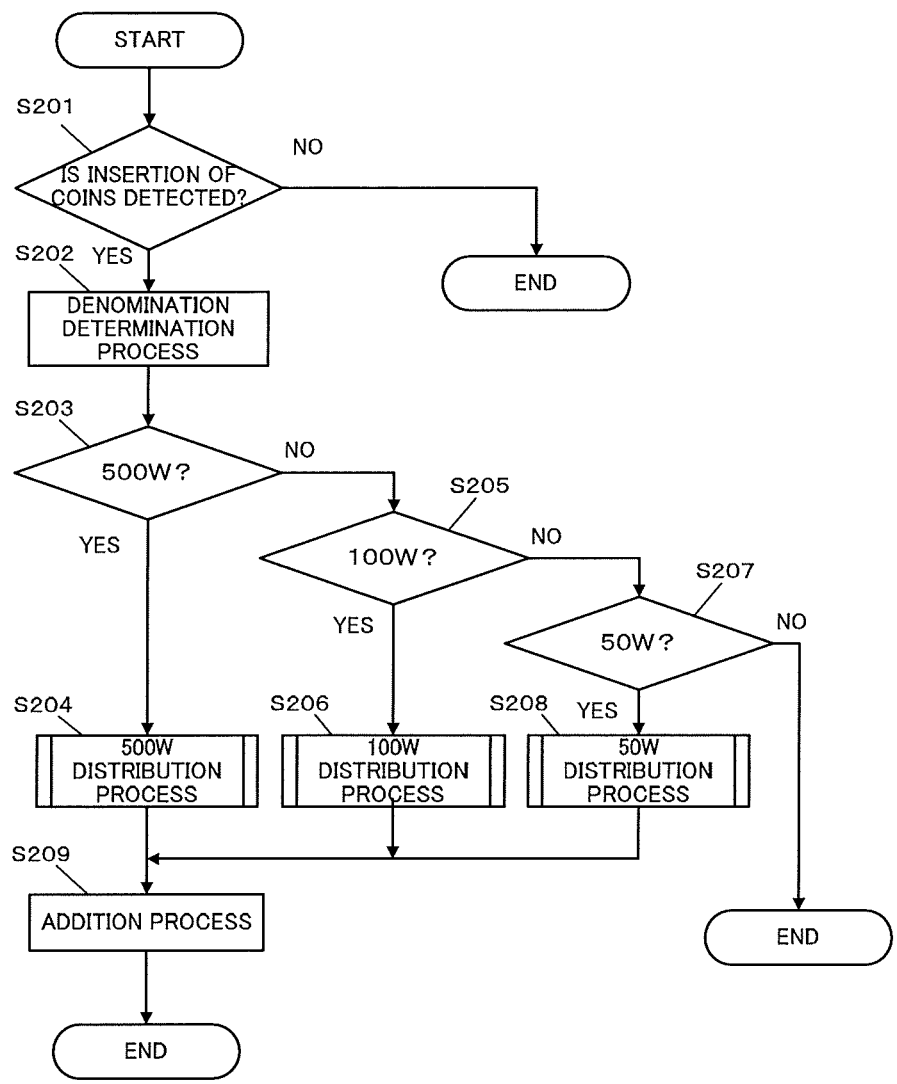

[Fig.5]
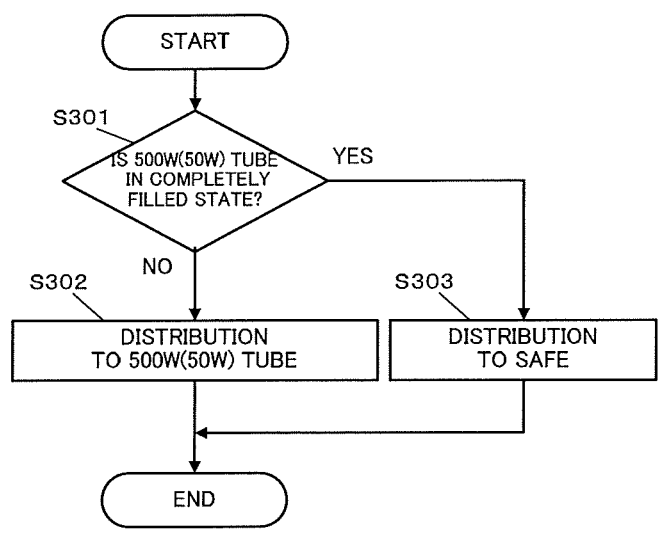

[Fig.6]
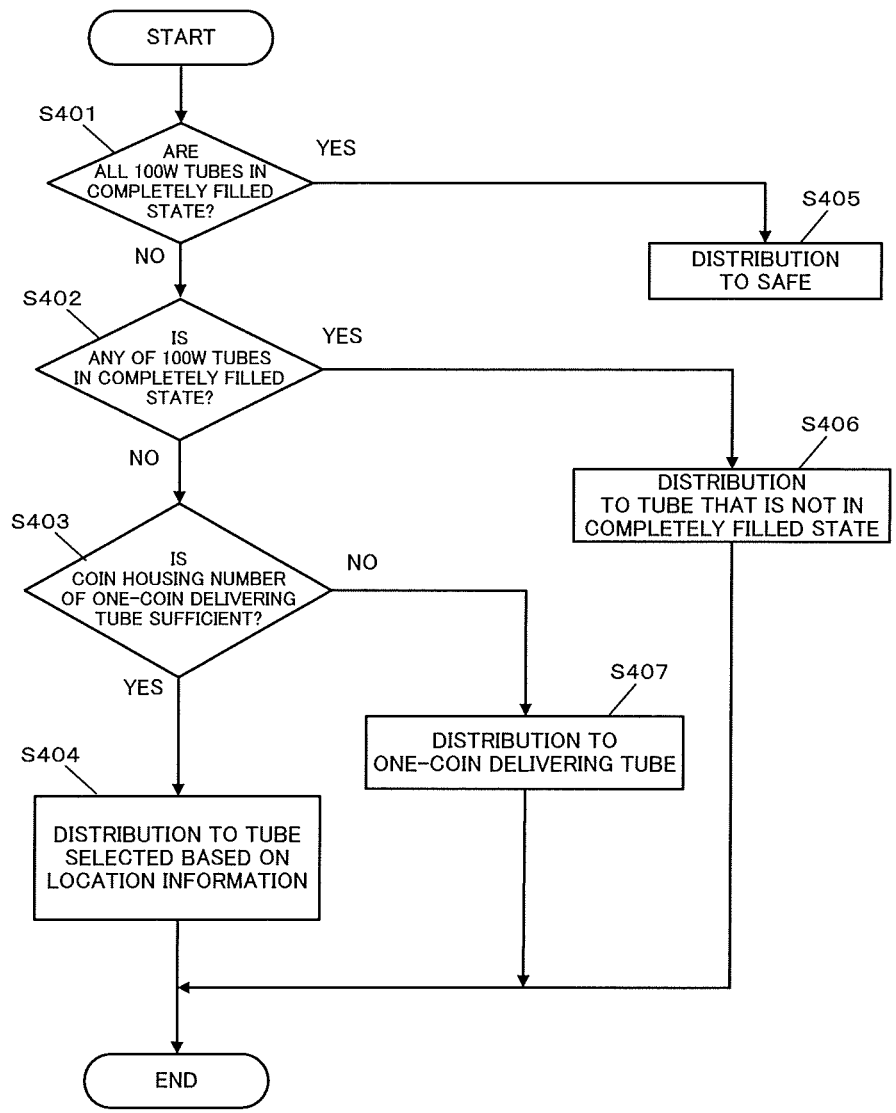

[Fig.7]
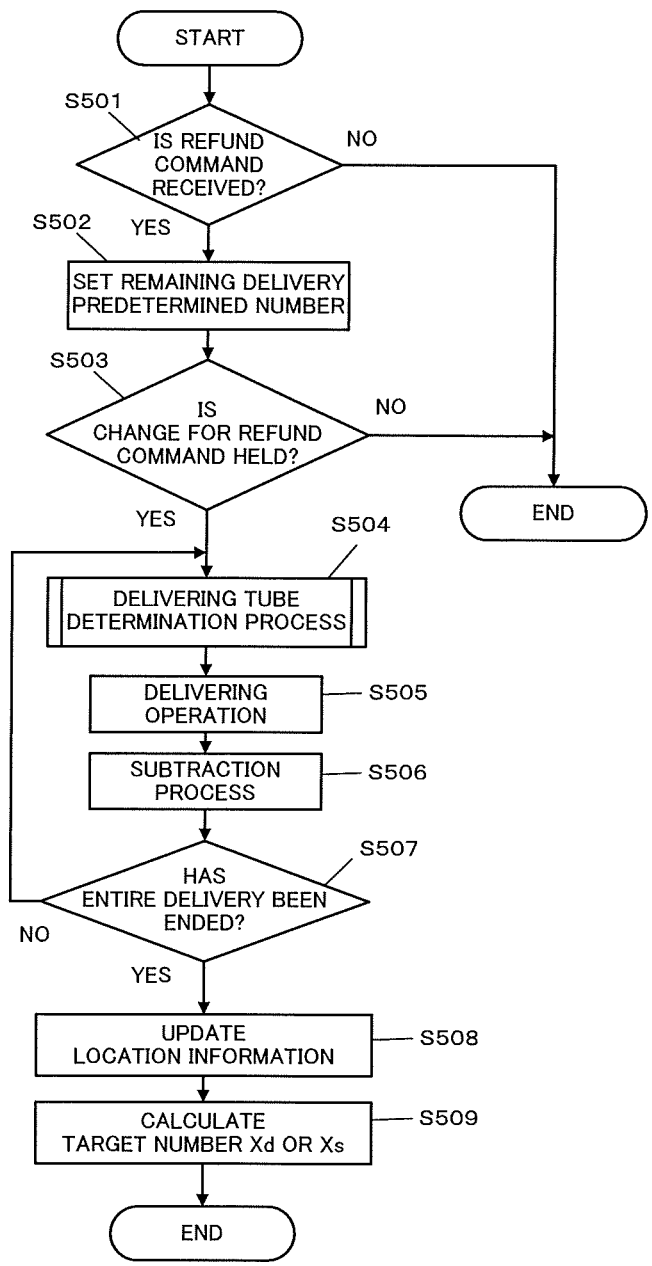

[Fig.8]
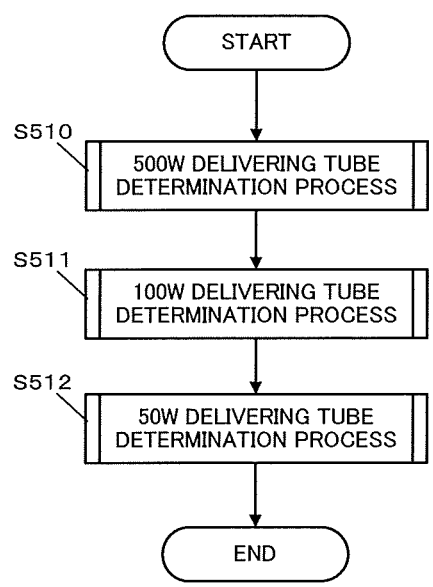

[Fig.9]
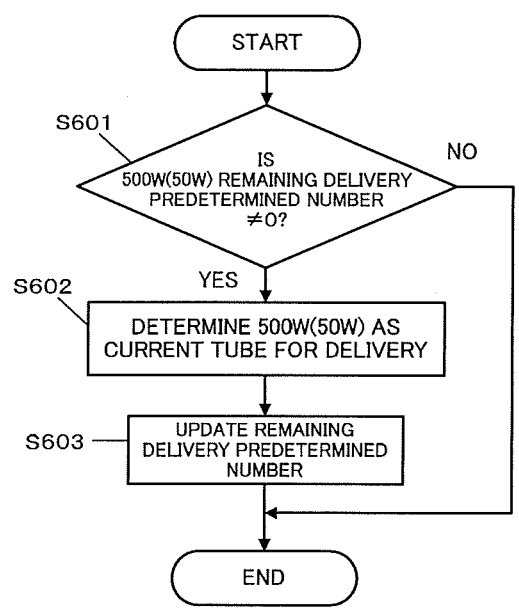

[Fig.10]
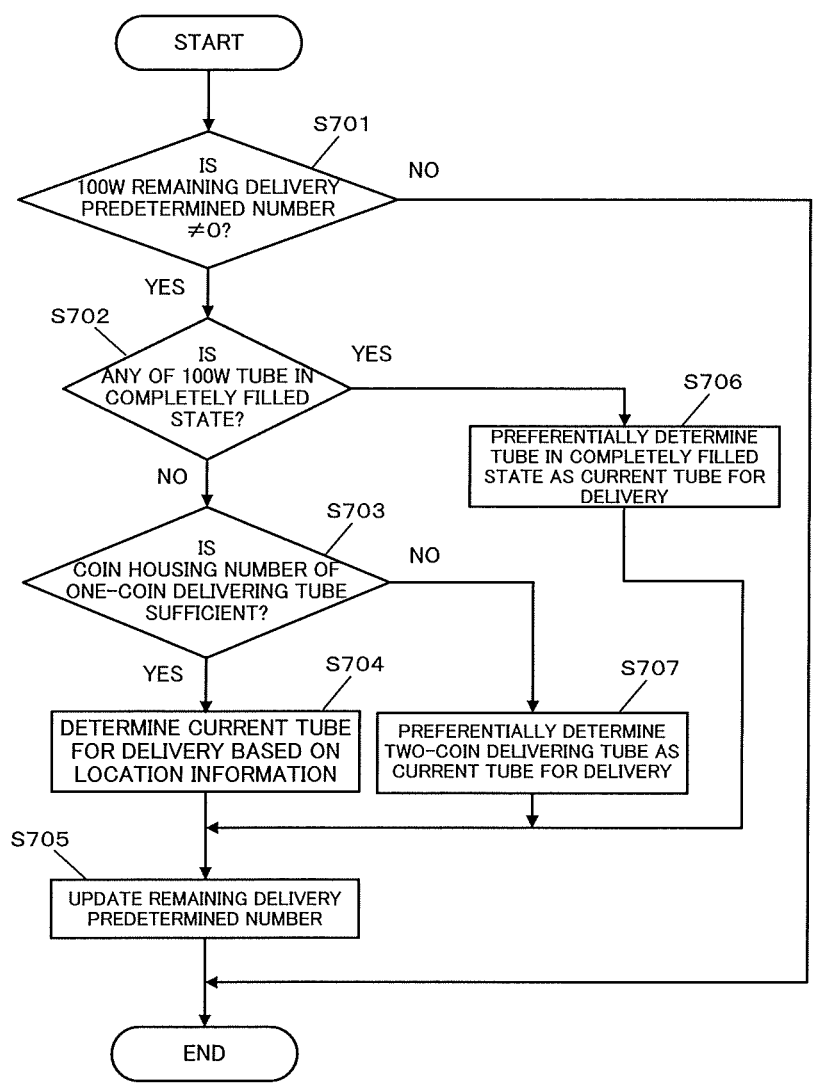

[Fig.11]
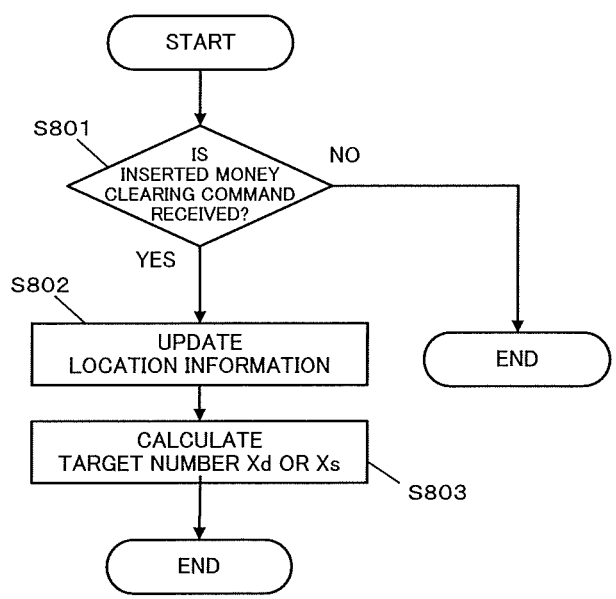

[Fig.12]
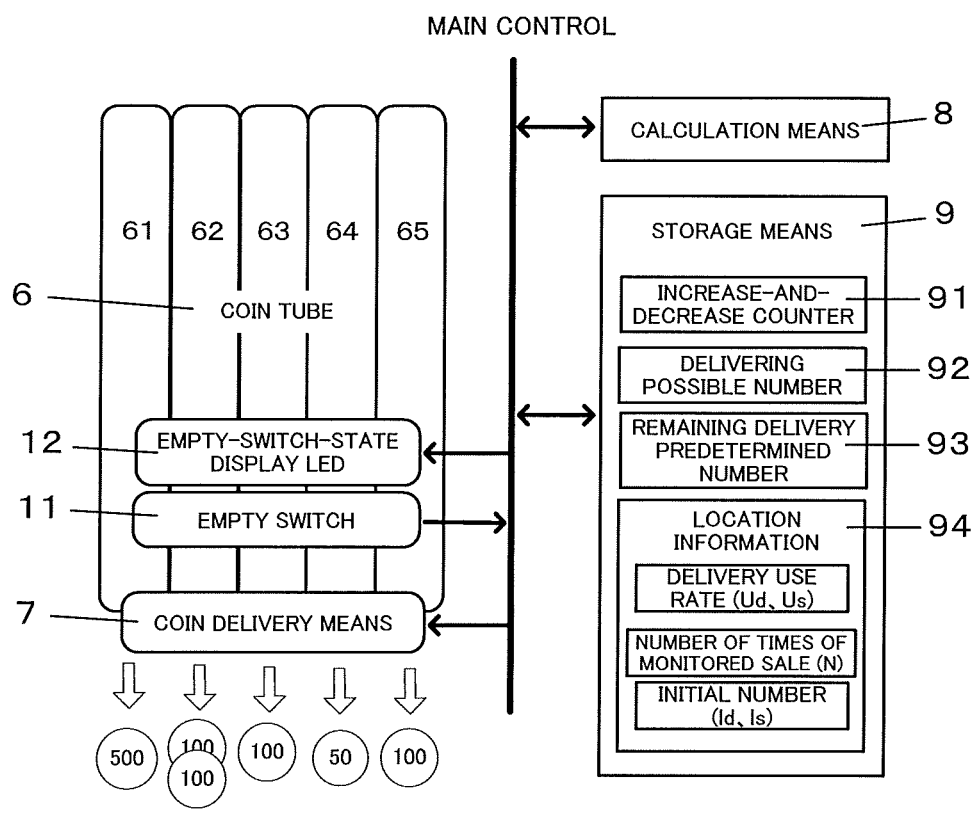

[Fig.13]
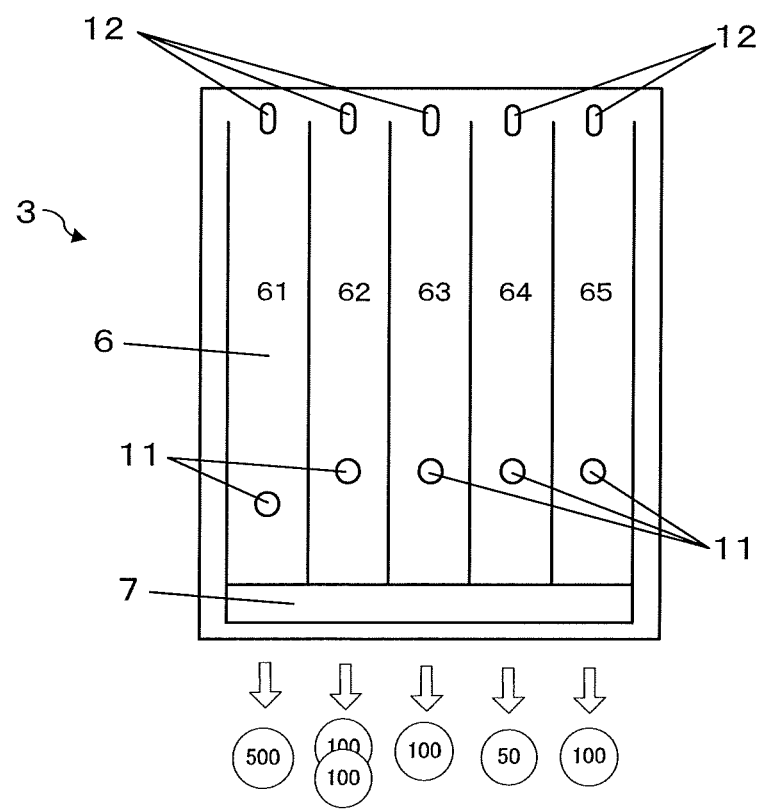

[Fig.14]
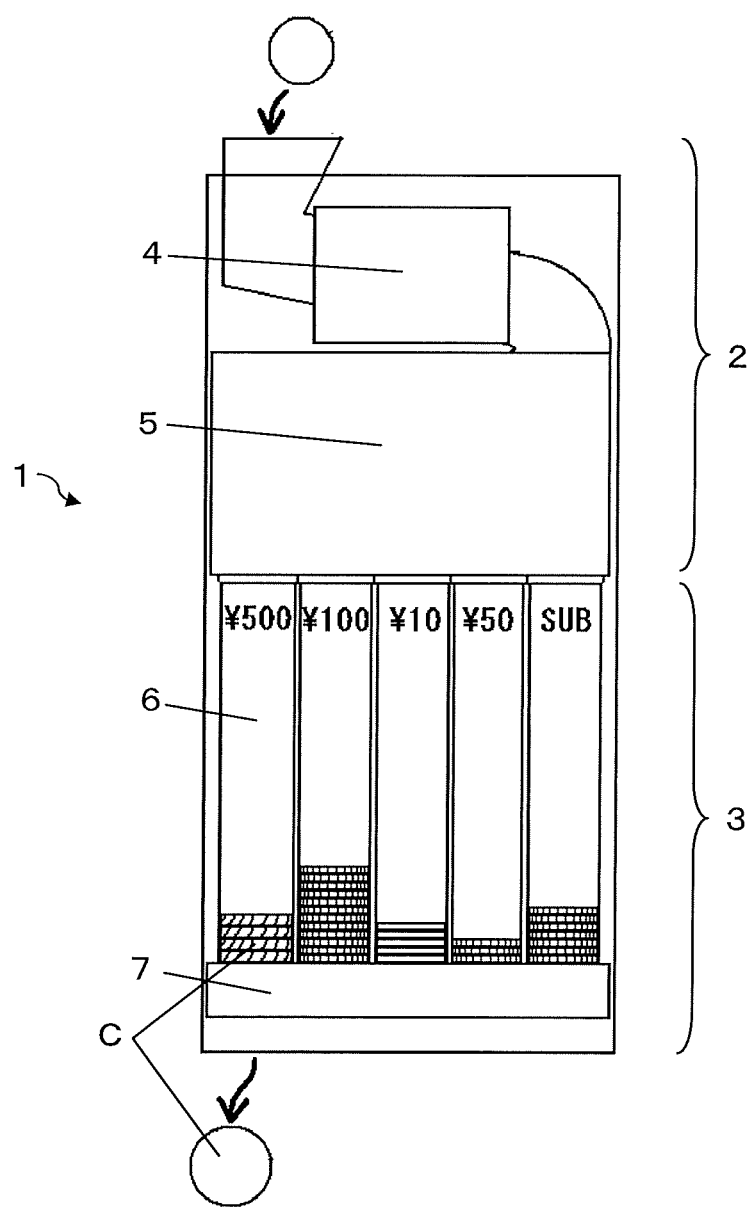

COIN PROCESSING DEVICE

TECHNICAL FIELD

The present invention relates to a coin processing device installed in a vending machine, an exchange machine, a fare adjustment machine, a ticket sales machine, a service device or the like (hereinafter referred to as "vending machine")

BACKGROUND ART

Conventionally, a coin processing device, which distinguishes genuineness of inserted coins, sorts and houses the inserted coins that have been determined as genuine coins for each denomination, and further, delivers the coins that have been sorted and housed in response to the amount of change or the like, is installed inside a vending machine or the like. FIG. 14 is a schematic view of such a coin processing device.

The coin processing device 1 is configured mainly of a coin sorting device 2 to distinguish genuineness of inserted coins and distribute the inserted coins for each denomination, and a coin delivering device 3 to house the inserted coins that have been distributed by the coin sorting device 2 for each denomination, and select and deliver coins, from the housed coins, in response to the amount of change or the like. Further, the coin sorting device 2 includes a coin identification means 4 to distinguish the genuineness and the denomination of the inserted coins and a coin distribution means 5 to distribute coins that have been determined as genuine coins by the coin identification means 4 for each denomination. In addition, the coin delivering device 3 includes a plurality of coin tubes 6 that houses the coins, which have been distributed for each denomination by the coin sorting device 2, for each denomination and a coin delivery means 7 to select and deliver coins from the plurality of coin tubes 6 in response to the amount of change or the like. A means, which delivers a coin by pulling out the coins housed in the coin tubes 6 one by one using a slide member referred to as a payout slide from slit-shaped holes opened at lowermost portions of the coin tubes 6, has been widely employed as the coin delivery means 7. The payout slide is provided with coin housing holes provided at portions corresponding to the lowermost portions of the respective coin tubes 6, and coins that have fit into the coin housing holes are pulled out. Further, the coin delivery means 7 selectively performs support of lower surfaces of the coins that have fit into the coin housing holes of the payout slide and release of the support using a slide members referred to as change slides, thereby controlling delivery and non-delivery of the pulled-out coin.

CITATION LIST

Patent Literature

Patent Literature 1: JP H07-262426 A
Patent Literature 2: JP 2013-37424 A

SUMMARY OF INVENTION

Technical Problem

In the coin processing device, there is a general demand for performing a process of delivering coins for as short a time as possible. Further, it is possible to consider a method of increasing speed in a delivery operation itself in order to perform the process of delivering coins for a short time, but, an adverse effect, such as a coin jam, easily occurs in the method of increasing the speed in the delivery operation itself, and it is difficult to achieve a considerable increase in speed.

An object of the present invention is to provide a coin processing device capable of increasing speed in a process of delivering coins without causing the above-described adverse effect.

Solution to Problem

In order to solve the above-described problems, a coin processing device of claim 1 is characterized by including: a coin identification means that identifies a denomination of inserted coins; a coin distribution means that distributes the coins identified by the coin identification means for each denomination; a plurality of coin tubes that house the coins distributed by the coin distribution means for each denomination; a coin delivery means that delivers the coins housed in the coin tubes by delivering operation of pulling out the coins using a payout slide; a two-coin delivering coin tube from which two coins are pulled out during one time of the delivering operation and a one-coin delivering coin tube from which one coin is pulled out during one time of the delivering operation for a specific denomination; and location information storage means that is a means for storing location information which includes a variable indicating a frequency of insertion of coins of the specific denomination into a device main body, variables indicating records of distribution of the coins of the specific denomination to the two-coin delivering coin tube and the one-coin delivering coin tube, and variables indicating records of delivery of the coins of the specific denomination from the two-coin delivering coin tube and the one-coin delivering coin tube, wherein the location information is used for at least any one of determination on the coin tube when the coin distribution means distributes the coins of the specific denomination and determination on the coin tube when the coin delivery means delivers the coins of the specific denomination.

A coin processing device of claim 2 is the coin processing device according to claim 1 and is characterized that, in a normal state where a coin housing number of the one-coin delivering coin tube is sufficient, the coin distribution means distributes the inserted coins of the specific denomination to the coin tube that is selected such that a number of times of sale, which enables delivery using both the two-coin delivering coin tube and the one-coin delivering coin tube, is predicted to be large based on the location information.

A coin processing device of claim 3 is the coin processing device according to claim 1 and is characterized that, in a normal state where a coin housing number of the one-coin delivering coin tube is sufficient, the coin delivery means delivers the coins of the specific denomination from the coin tube selected such that a number of times of the delivering operation becomes a minimum, and delivers the coins according to a pattern selected such that a number of times of sale, which enables delivery using both the two-coin delivering coin tube and the one-coin delivering coin tube, is predicted to be large based on the location information when there are a plurality of patterns in which the number of times of the delivering operation becomes the minimum.

A coin processing device of claim 4 is the coin processing device according to claim 2 or 3 and is characterized by further including a coin detection means that detects that a coin housing number of each of the coin tubes becomes a predetermined number or less, wherein it is determined as the normal state when the coin detection means does not detect that the coin housing number becomes the predetermined number or less in one or more of the one-coin delivering coin tubes.

A coin delivering device of claim 5 is characterized by including: a plurality of coin tubes that house coins for each denomination; a coin delivery means that delivers the coins housed in the coin tubes by delivering operation of pulling out the coins using a payout slide; a two-coin delivering coin tube from which two coins are pulled out during one time of the delivering operation and a one-coin delivering coin tube from which one coin is pulled out during one time of the delivering operation for a specific denomination; and a location information storage means that is a means for storing location information which includes at least variables indicating records of delivery of the coins of the specific denomination from the two-coin delivering coin tube and the one-coin delivering coin tube, wherein the location information is used to determine the coin tube when the coin delivery means delivers the coins of the specific denomination.

Advantageous Effects of Invention

According to the present invention, it is possible to increase the speed in the process of delivering coins.

BRIEF DESCRIPTION OF DRAWINGS

FIG. 1 is a block diagram of a coin processing device according to an embodiment of the present invention.

FIG. 2 is a schematic view of the coin processing device according to the embodiment of the present invention.

FIG. 3 is a flowchart illustrating a flow of operation of the coin processing device according to the embodiment of the present invention.

FIG. 4 is a flowchart illustrating a flow of a distribution process of the coin processing device according to the embodiment of the present invention.

FIG. 5 is a flowchart illustrating a flow of a 500W (50W) distribution process of the coin processing device according to the embodiment of the present invention.

FIG. 6 is a flowchart illustrating a flow of a 100W distribution process of the coin processing device according to the embodiment of the present invention.

FIG. 7 is a flowchart illustrating a flow of a delivery process of the coin processing device according to the embodiment of the present invention.

FIG. 8 is a flowchart illustrating a flow of a delivering tube determination process of the coin processing device according to the embodiment of the present invention.

FIG. 9 is a flowchart illustrating a flow of a 500W (50W) delivering tube determination process of the coin processing device according to the embodiment of the present invention.

FIG. 10 is a flowchart illustrating a flow of a 100W delivering tube determination process of the coin processing device according to the embodiment of the present invention.

FIG. 11 is a flowchart illustrating a flow of an inserted money clearing process of the coin processing device according to the embodiment of the present invention.

FIG. 12 is a block diagram of a coin delivering device according to the embodiment of the present invention.

FIG. 13 is a schematic view of the coin delivering device according to the embodiment of the present invention.

FIG. 14 is a schematic view of the conventional coin processing device.

DESCRIPTION OF EMBODIMENTS

Hereinafter, one of embodiments of the present invention will be described with reference to the drawings.

FIG. 1 is a block diagram of a coin processing device according an embodiment of the present invention 1, and FIG. 2 is a schematic view of the coin processing device 1 according to the embodiment of the present invention and schematically illustrates a cross section of the coin processing device 1. A structure of the coin processing device 1 according to this embodiment is the same as the conventional coin processing device described above except for parts to be described hereinafter. Accordingly, members among components in this embodiment that are equivalent to the components of the above-described conventional coin processing device will be denoted by the same reference signs, and the detailed description thereof will be omitted.

This coin processing device 1 include a coin identification means 4, a coin distribution means 5, five coin tubes 6, a coin delivery means 7, a calculation means 8, and a storage means 9. This coin delivery means 7 includes one payout slide provided with five coin housing holes corresponding to the respective coin tubes 6 and delivers a coin fit into the coin housing hole by pulling out the payout slide. Each of the coin tubes 6 is provided with a completely-filled-state detection switch 10, which is a sensor that detects that the coins housed in the coin tube 6 is in a completely filled state, and an empty switch 11 which is a sensor that detects that the number of coins housed in the coin tube 6 becomes a predetermined number or less. In addition, the coin processing device 1 includes each increase-and-decrease counter 91 of the coin tubes 6 in the storage means 9 in order to grasp the number of coins housed in each of the coin tubes 6. An initial value of the increase-and-decrease counter 91 when power is turned on or when the attachment or detachment of the coin tube 6 is recognized is zero, and is added when a coin is distributed to the coin tube 6 and subtracted when a coin is delivered from each of the coin tubes 6. In addition, the storage means 9 of the coin processing device 1 has a region to store a delivering possible number 92 and a remaining delivery predetermined number 93 of each of the coin tubes 6 which are necessary for processing after reception of a refund command from a main control 13 of a vending machine or the like. The delivering possible number 92 is the number of coins that can be reliably delivered from each of the coin tubes 6 and has been recognized by the coin processing device 1. When the power of the device main body is turned on or when the attachment or detachment of the coin tubes 6 is recognized, the count of the delivering possible number 92 begins with zero in a case where the empty switch 11 has detected that the number of coins housed in each of the coin tubes 6 is the predetermined number or less, and begins with a number obtained by adding one to the predetermined number in a case where the empty switch 11 has not detected that the number of coins housed in each of the coin tubes 6 is the predetermined number or less. Thus, basically, the delivering possible number 92 is added when a coin is distributed to each of the coin tubes 6, and is subtracted when a coin is delivered from each of the coin tubes 6. Meanwhile, the delivering possible number 92 is not subtracted so as to be the predetermined number or less while the empty switch 11 has not detected that the number of coins housed in each of the coin tubes 6 is the predetermined number or less, and is set as a completely-filled-state number when the completely-filled-state detecting sensor 10 detects a completely filled state. It is possible to grasp the number of coins that can be reliably delivered from each of the coin tubes 6, that is, the minimal housing number of coins housed in each of the coin tubes 6 by the delivering possible number 92. The above-described configuration is the same as the configuration of the conventional coin processing device.

From the left side in FIGS. 1 and 2, the five coin tubes 6 of the coin processing device 1 indicate a 500W tube 61 that houses 500 won coins, a 100W two-coin delivering tube 62 that houses 100 won coins, a 100W one-coin delivering tube A63 that houses 100 won coins, a 50W tube 64 that houses 50 won coins, and a 100W one-coin delivering tube B65 that houses 100 won coins. Here, the 100W two-coin delivering tube 62 is a two-coin delivering coin tube that delivers two coins at one-time delivering operation (operation corresponding to one round trip of pulling out and return of the payout slide). The point of using the two-coin delivering coin tube is a technical idea newly derived by the applicants of the present disclosure, and is a configuration that is not disclosed in the related art. To deliver two coins at once from a coin tube during the one-time delivering operation (operation corresponding to one round trip of pulling out and return of the payout slide) can be realized by setting a height of an inner wall of a coin housing hole of the payout slide corresponding to the coin tube to be a height of two coins, housing two coins in the coin housing hole, and pulling out the two coins housed in the coin housing hole by pulling out the payout slide once. It is possible to consider a method of providing a standing wall around a coin housed hole on the payout slide as a method of setting the height of the inner wall of the coin housing hole of the payout slide to the height of two coins. The four coin tubes 61, 63, 64 and 65, except for the 100W two-coin delivering tube 62, deliver one coin during the one-time delivering operation (operation corresponding to one round trip of pulling out and return of the payout slide), similarly to the conventional coin tubes.

In this manner, the coin processing device 1 uses the two-coin delivering coin tube (the 100W two-coin delivering tube 62) and the one-coin delivering coin tubes (the 100W one-coin delivering tube A63 and the 100W one-coin delivering tube B65) together for 100 won coins, and the inventors of the present application have found that such a configuration has problems to be described below and solutions to the problems.

The two-coin delivering coin tube 62 is capable of delivering two coins, but incapable of delivering one coin during the one-time delivering operation, and thus, is difficult to respond to delivery of an odd-number of coins when no coin is housed in the one-coin delivering coin tubes 63 and 65. Therefore, when no coin is housed in the one-coin delivering coin tubes 63 and 65, it is difficult to deliver a 100 won coin as change even if a large number of coins are housed in the two-coin delivering coin tube 62. That is, when no coin is housed in the one-coin delivering coin tubes 63 and 65, the coin processing device 1 needs to set the delivering possible number to zero regardless of presence or absence of a coin in the two-coin delivering coin tube 62.

Due to such a problem, it is necessary to avoid a state where a coin is housed only in the two-coin delivering coin tube 62 and no coin is housed in the one-coin delivering coin tubes 63 and 65 when the two-coin delivering coin tube 62 and the one-coin delivering coin tubes 63 and 65 are used together. It is possible to consider a method of preferentially distributing a coin that has been inserted to the one-coin delivering coin tube 62 and preferentially delivering change from the two-coin delivering coin tube 62 as a solution to the problem. With this method, however, it is likely to occur a state where there is no coin in the two-coin delivering coin tube 62 and a lot of coins are housed in the one-coin delivering coin tubes 63 and 65, and the number of times of delivering operation that is required increases in this state so that the delivery of the coin is delayed.

Thus, the coin processing device 1 according to the embodiment of the present invention performs different processing among a normal state where coins for change are sufficiently housed in the one-coin delivering coin tubes 63 and 65, a change-shortage state where coins for change are not sufficiently housed in the one-coin delivering coin tubes 63 and 65, and a completely-filled-tube-present state where any of the two-coin delivering coin tube 62 and the one-coin delivering coin tubes 63 and 65 is in the completely filled state in regard to the determination on the coin tubes 6 as a distribution destination of inserted coins and determination on the coin tube 6 to perform the delivery of coins.

The determination on whether each coin housing number of the one-coin delivering coin tubes 63 and 65 is sufficient is performed based on output of the empty switch 11 serving as a coin detection means in the coin processing device 1 according to the present embodiment. When the empty switch 11 has not detected that the number of housed coins is the predetermined number or less in any of the one-coin delivering coin tubes (the 100W one-coin delivering tube A63 or the 100W one-coin delivering tube B65), it is determined that each coin housing number of the one-coin delivering coin tubes 63 and 65 is sufficient. When the empty switch 11 has detected that the number of housed coins is the predetermined number or less in all the one-coin delivering coin tubes (the 100W one-coin delivering tube A63 and the 100W one-coin delivering tube B65), it is determined that each coin housing number of the one-coin delivering coin tubes 63 and 65 is not sufficient. The predetermined number of the empty switch 11 is set to be normally about 10 for the 100 won coin. In addition, the determination on whether any of the one-coin delivering coin tubes 63 and 65 is in the completely filled state is performed by determining whether the completely-filled-state detection sensor 10 has detected the completely filled state.

First, a description will be given regarding the processing in the normal state where the coins for change are sufficiently housed in the one-coin delivering coin tubes 63 and 65. In the normal state, the coin processing device 1 learns tendencies of payment and refund of coins in a location where the device is used. Further, the coin processing device 1 performs the distribution of inserted coins such that a period in which coins for change are housed in both the two-coin delivering coin tube 62, and the one-coin delivering coin tubes 63 and 65 becomes a maximum using the learned tendencies of payment and refund of coins as premises. In addition, the coin processing device 1 performs the delivery of coins such that the number of times of delivering operation (operation corresponding to one round trip of pulling out and return of the payout slide) becomes a minimum. When there are a plurality of patterns in which the number of times of delivering operation becomes the minimum, a pattern in which the period in which coins for change are housed in both the two-coin delivering coin tube 62, and the one-coin delivering coin tubes 63 and 65 becomes the maximum is selected among the plurality of patterns using the learned tendencies of payment and refund of coins as the premises. Incidentally, the coin processing device 1 performs the distribution of inserted coins and the delivery of coins evenly for the one-coin delivering coin tubes 63 and 65 such that a difference between the coin housing numbers of the respective one-coin delivering coin tubes 63 and 65 maximally becomes one.

The coin processing device 1 has a region to store location information 94, configured of a plurality of variables indicating the tendencies of payment and refund, in the storage means 9 in order to learn the tendencies of payment and refund of coins in a location where the device is used. The location information 94 includes a replenishment rate H of 100 won coins, which is a variable indicating a frequency of insertion of the 100 won coins, a distribution rate Sd to the two-coin delivering coin tube 62, which is a variable indicating a record of distribution of the 100 won coins to the respective coin tubes, a delivery use rate Ud of the two-coin delivering coin tube 62, which is a variable indicating a record of delivery of the 100 won coins from the two-coin delivering coin tube 62, and a delivery use rate Us of the one-coin delivering coin tubes 63 and 65 which is a variable indicating a record of delivery of the 100 won coins from the one-coin delivering coin tubes 63 and 65. The coin processing device 1 keeps learning the tendencies of payment and refund of coins in a location where the device is used by sequentially updating values of these variables every sale.

The replenishment rate H of the 100 won coins is the variable which represents the number of 100 won coins that have been inserted per one-time sale in recent N times of sale. For example, when N=10 and three 100 won coins in total have been inserted in recent ten times of sale, the replenishment rate H is 30%. The replenishment rate H of the 100 won coins is the variable that can take a value exceeding 100%.

The distribution rate Sd to the two-coin delivering coin tube 62 is the variable which represents a ratio of inserted 100 won coins that have been distributed to the two-coin delivering coin tube 62 among the two-coin delivering coin tube 62, and the one-coin delivering coin tubes 63 and 65 in recent N times of sale. The distribution rate Sd to the two-coin delivering coin tube 62 is the variable that takes a value between 0 to 100%. Incidentally, the distribution rate Ss to the one-coin delivering coin tubes 63 and 65 is a value equal to 1−Sd.

The delivery use rate Ud of the two-coin delivering coin tube 62 is the variable that represents the number of times of delivering operation in which the delivery of coins from the two-coin delivering coin tube 62 has been performed per one-time sale in recent N times of sale. For example, when N=10 and eight times of the delivering operation in total in which the delivery of coins from the two-coin delivering coin tube 62 has been performed in recent ten times of sale, the delivery use rate Ud of the two-coin delivering coin tube 62 is 80%. There is a case where two times or more of delivering operation is performed during one-time sale, such as the case of performing delivery of five or more 100 won coins during one-time sale, and thus, the delivery use rate Ud of the two-coin delivering coin tube 62 is the variable that can take a value exceeding 100%.

In addition, the delivery use rate Us of the one-coin delivering coin tubes 63 and 65 is the variable that represents the number of times of delivering operation in which the delivery of coins from the one-coin delivering coin tubes 63 and 65 has been performed per one-time sale in recent N times of sale. When delivery is performed from the two one-coin delivering coin tubes 63 and 65 during one-time delivering operation in the case where the two one-coin delivering coin tubes 63 and 65 are provided as in the coin processing device 1, the one-time delivering operation is counted as twice. The delivery use rate Us of the one-coin delivering coin tubes 63 and 65 is also the variable that can take a value exceeding 100%, similarly to the delivery use rate Ud of the two-coin delivering coin tube.

Incidentally, the number of times of sale N at the time of calculating values of the respective variables forming the location information 94 is the number of times of monitored sale N in order to learn the tendencies of payment and refund of coins in a location where the device is used. Further, a certain level of the number of times of monitored sale N is required to accurately grasp the tendencies of payment and refund of coins in a location where the device is used, but time is required or a lot of memory is required for processing an algorithm for the distribution of inserted coins and the delivery of coins to be described later as the number of times of monitored sale N is set to be larger. Thus, the number of times of monitored sale N is determined balancing accuracy and processing speed in grasping the tendencies of payment and refund. In addition, it is also possible to consider to enhance the accuracy of learning by setting the number of times of monitored sale N to a large value in the case of using the device in a location where the tendencies of payment and refund are stable, and to enhance the followability to a variation in the tendencies of payment and refund by setting the number of times of monitored sale N to a small value in accordance with a period of the variation in the case of using the device in a location where the tendencies of payment and refund vary in a short time.

The values of the respective variables forming location information described above are updated at the time of ending each sale in a vending machine or the like in the normal state. On the other hand, in the change-shortage state and the completely-filled-tube-present state, the distribution of inserted coins and the delivery of coins on which the location information is reflected are not performed. Thus, the update of the values of the respective variables forming location information is not performed, and further, each result of the distribution of inserted coins and the delivery of coins in these states is not used for calculation of the values of the respective variables forming location information. The end of each sale is determined based on the end of the process of delivering coins after receiving a refund command from the main control of the vending machine or the like or the reception of an inserted money clearing command from the main control of the vending machine or the like. The inserted money clearing command is issued in order to confirm the receipt of inserted coins when the sale with no change, that is, a so-called just sale has been performed. In addition, when the coin processing device 1 is installed at a location where the tendencies of payment and refund have not been learned, the operation of the coin processing device 1 is initiated by inputting values of the variable that have been assumed upon experience in advance.

It is possible to predict the number of times of sale that uses up the coins for change that have been housed in each of the two-coin delivering coin tube 62 and the one-coin delivering coin tubes 63 and 65 by using these variables forming the location information. First, it is possible to calculate a number of times of predicted sale Nd until the coins for change housed in the two-coin delivering coin tube 62 are used up approximately using $Nd=Id/(2 \times Ud-H \times Sd)$ when the initial number of 100 won coins housed in the two-coin delivering coin tube 62 is set to Id. Similarly, it is possible to calculate the number of times of predicted sale Ns until the coins for change housed in the one-coin delivering coin tubes 63 and 65 are used up approximately using $Ns=Is/(Us-H \times Ss)$ when the initial number of 100 won coins housed in the one-coin delivering coin tubes 63 and 65 is set to Is. Here, a relation of $Ss=1-Sd$ is established, and thus, $Ns=Is/(Us-H\times(1-Sd))$ is obtained. Incidentally, the predicted number of times of sale from the time of replenishment of coins is calculated using the value of the initial number as Id and Is, here. In this case, the prediction deviates from the reality when a cumulative number of times of sale increases and the tendencies of payment and refund are varied from the initial state. In order to deal with the problem, a predicted number of times of sale from a current point in time may be calculated using the delivering possible number 92 instead of the initial number as Id and Is.

Further, the coin processing device 1 performs the distribution of inserted coins and the delivery of coins according to a distribution algorithm and a delivery algorithm to be described below such that the number of times of predicted sale Nd of the two-coin delivering coin tube 62 and the number of times of predicted sale Ns of the one-coin delivering coin tubes 63 and 65 become as large as possible, that is, the number of times of sale that enables the delivery using both the two-coin delivering coin tube 62, and the one-coin delivering coin tubes 63 and 65 becomes as large as possible.

First, the coin processing device 1 calculates the distribution rate Sd to the two-coin delivering coin tube 62 in which a smaller value between the number of times of predicted sale Nd of the two-coin delivering coin tube 62 and the number of times of predicted sale Ns of the one-coin delivering coin tubes 63 and 65 becomes the largest at a point in time before sale using the replenishment rate H of the 100 won coins, the delivery use rate Ud of the two-coin delivering coin tube 62, and the delivery use rate Us of the one-coin delivering coin tubes 63 and 65 at this point in time as premises, and sets this calculated distribution rate as an ideal distribution rate Ideal-Sd to the two-coin delivering coin tube 62 in regard to the distribution algorithm. In addition, a distribution rate to the one-coin delivering coin tubes 63 and 65 at this time is set as an ideal distribution rate Ideal-Ss to the one-coin delivering coin tubes 63 and 65. At this time, a relation of $Ideal-Ss=1-Ideal-Sd$ is established.

Further, any number of 100 won coins that makes the actual distribution rates Sd and Ss be the same values as the ideal distribution rates Ideal-Sd and Ideal-Ss when being distributed to the two-coin delivering coin tube 62 or the one-coin delivering coin tubes 63 and 65 is calculated using the ideal distribution rates Ideal-Sd and Ideal-Ss and the actual distribution rates Sd and Ss before sale.

In a case where the ideal distribution rate Ideal-Sd to the two-coin delivering coin tube 62 is higher than the actual distribution rate Sd, a relation of (the number of coins that have been distributed to the two-coin delivering coin tube during past N times of sale+Xd)/(the number of inserted 100 won coins during past N times of sale+Xd)=Ideal-Sd is approximately established when a distribution number of 100 won coins to the two-coin delivering coin tube 62, required to make the actual distribution rate Sd to the two-coin delivering coin tube 62 be the same value as the ideal distribution rate Ideal-Sd, is set to Xd. Further, the number of coins that have been distributed to the two-coin delivering coin tube 62 during past N times of sale is expressed by $H\times Sd\times N$ and the number of inserted 100 won coins during past N times of sale is expressed by $H\times N$, and thus, a relation $(H\times Sd\times N+Xd)/(H\times N+Xd)=Ideal-Sd$ is established. When this relational expression is deformed, $Xd=H\times N\times(Ideal-Sd-Sd)/(1-Ideal-Sd)$ is obtained, and it is possible to calculate the number of inserted 100 won coins Xd when the actual distribution rate Sd becomes the same value as the ideal distribution rate Ideal-Sd using this relational expression.

In addition, in a case where the ideal distribution rate Ideal-Sd to the two-coin delivering coin tube 62 is the actual distribution rate Sd or lower, that is, a case where the ideal distribution rate Ideal-Ss to the one-coin delivering coin tubes 63 and 65 ($=1-Ideal-Sd$) is the actual distribution rate Ss or higher, a relation (the number of coins that have been distributed to the one-coin delivering coin tube during past N times of sale+Xs)/(the number of inserted 100 won coins during past N times of sale+Xs)=Ideal-Ss is approximately established when the distribution number of 100 won coins to the one-coin delivering coin tubes 63 and 65, required to make the actual distribution rate Ss to the one-coin delivering coin tubes 63 and 65 ($=1-Sd$) be the same value as the ideal distribution rate Ideal-Ss ($=1-Ideal-Sd$), is set to Xs. Further, the number of coins that have been distributed to the one-coin delivering coin tube during past N times of sale is expressed by $H\times Ss\times N$ and the number of inserted 100 won coins during past N times of sale is expressed by $H\times N$, and thus, a relation $(H\times Ss\times N+Xs)/(H\times N+Xs)=Ideal-Ss$ is established. When this relational expression is deformed, $Xs=H\times N\times(Ideal-Ss-Ss)/(1-Ideal-Ss)$ is obtained, and it is possible to calculate the number of inserted 100 won coins Xs when the actual distribution rate Ss becomes the same value as the ideal distribution rate Ideal-Ss using this relational expression. Here, relations of $Ss=1-Sd$ and $Ideal-Ss=1-Ideal-Ss$ are established, and thus, $Xs=H\times N\times(Sd-Ideal-Sd)/Ideal-Sd$ is obtained.

In this manner, the distribution number Xd of 100 won coins to the two-coin delivering coin tube 62, required to make the actual distribution rate Sd to the two-coin delivering coin tube 62 be the same value as the ideal distribution rate Ideal-Sd, or the distribution number Xs to the one-coin delivering coin tubes 63 and 65 is calculated in advance before sale in the vending machine or the like, and these required distribution numbers set as distribution target numbers Xd and Xs in the coin processing device 1.

The coin processing device 1 calculates the distribution target number Xd or Xs to the two-coin delivering coin tube 62 or the one-coin delivering coin tubes 63 and 65 at the point in time before sale, that is, at the time of ending the previous sale using the replenishment rate H of the 100 won coins, the distribution rate Sd to the two-coin delivering coin tube 62, the delivery use rate Ud of the two-coin delivering coin tube 62 and the delivery use rate Us of the one-coin delivering coin tubes 63 and 65 at this point in time as premises according to the above-described calculation method.

Further, when one or two or more coins are inserted at the time of sale in the vending machine or the like, the coin processing device 1 distributes the inserted coins until reaching the target number Xd to the two-coin delivering coin tube 62 in a case where the ideal distribution rate Ideal-Sd to the two-coin delivering coin tube 62 is higher than the actual distribution rate Sd, and distributes the inserted coins until reaching the target number Xs to the one-coin delivering coin tubes 63 and 65 in a case where the ideal distribution rate Ideal-Sd to the two-coin delivering coin tube 62 is the actual distribution rate Sd or lower. In addition, the coin processing device 1 distributes the inserted coins alternately to the two-coin delivering coin tube 62, and the one-coin delivering coin tubes 63 and 65 after the distribution to the two-coin delivering coin tube 62 or the one-coin delivering coin tubes 63 and 65 during one-time sale reaches the target number Xd or Xs, or distributes the inserted coins according to a specific pattern substantially proportional to the ideal distribution rate Ideal-Sd to the two-coin delivering coin tube 62. Incidentally, it is also possible to consider a method of employing a process of performing a certain division and distributing all coins to the other coin tubes after reaching the target number Xd or Xs so as to enable the distribution even when coins are continuously inserted at a short interval.

In this manner, the coin processing device 1 performs the distribution in the normal state such that the actual distribution rate Sd approximates to the ideal distribution rate Ideal-Sd so as to increase the number of times of sale that enables the delivery using both the two-coin delivering coin tube 62, and the one-coin delivering coin tubes 63 and 65 as much as possible.

In addition, the coin processing device 1 performs the delivery of coins such that the number of times of delivering operation becomes the minimum in regard to the delivery algorithm. When there are the plurality of patterns in which the number of times of delivering operation becomes the minimum, the pattern in which the period in which coins for change are housed in both the two-coin delivering coin tube 62, and the one-coin delivering coin tubes 63 and 65 becomes the maximum is selected among the plurality of patterns using the learned tendencies of payment and refund of coins as the premises. Incidentally, when the case where there are the plurality of patterns in which the number of times of delivering operation becomes the minimum is exemplified, there are a pattern in which two 100 won coins are delivered from the two-coin delivering coin tube 62 and a pattern in which the coins are delivered one by one from the respective one-coin delivering coin tubes 63 and 65 in the case of delivering the two 100 won coins during one-time sale. Further, the number of times of predicted sale Nd until the coins for change housed in the two-coin delivering coin tube 62 are used up can be calculated approximately from the relational expression of $Nd=Id/(2 \times Ud-H \times Sd)$, the number of times of predicted sale Ns until the coins for change housed in the one-coin delivering coin tubes 63 and 65 can be calculated approximately from the relational expression of $Ns=Is/(Us-H \times (1-Sd))$. It is possible to calculate the numbers of times of predicted sale Nd and Ns in the case of selecting the respective delivery patterns by substituting the delivery use rate Ud of the two-coin delivering coin tube and the delivery use rate Us of the one-coin delivering coin tube, after sale in a case where the sale is performed by selecting each delivery pattern, in the relational expression. Further, the coin processing device 1 selects the delivery pattern in which the smaller value between the number of times of predicted sale Nd of the two-coin delivering coin tube 62 and the number of times of predicted sale Ns of the one-coin delivering coin tubes 63 and 65, calculated in this manner, becomes the largest.

In this manner, when there are the plurality of patterns in which the number of times of delivering operation becomes the minimum, the coin processing device 1 performs the delivery of coins such that the number of times of predicted sale Nd of the two-coin delivering coin tube 62, and the number of times of predicted sale Ns of the one-coin delivering coin tubes 63 and 65 become as large as possible, that is, the number of times of sale that enables the delivery using both the two-coin delivering coin tube 62, and the one-coin delivering coin tubes 63 and 65 becomes as large as possible in regard to the delivery of coins in the normal state.

Next, a description will be given regarding the processing in the change-shortage state where the coins for change are not sufficiently housed in the one-coin delivering coin tubes 63 and 65. In the change-shortage state, the coin processing device 1 performs the distribution of inserted coins intensively with respect to the one-coin delivering coin tubes 63 and 65, and performs the delivery of coins from the two-coin delivering coin tube 62 if possible even though the number of times of delivering operation is increased. To be specific, the coin processing device 1 performs the distribution of inserted coins to a tube with the larger coin housing number between the one-coin delivering coin tubes 63 and 65, and performs the delivery of coins from the two-coin delivering coin tube 62 if possible and performs the delivery of coins from the one-coin delivering coin tubes 63 and 65 only when the delivery number is an odd number. Further, the delivery of coins is performed preferentially from a tube with a smaller coin housing number between the one-coin delivering coin tubes 63 and 65. Here, the distribution of coins is preferentially performed to the tube with the larger coin housing number, and the delivery of coins is preferentially performed from the tube with the smaller coin housing number so as to resolve the change-shortage state as fast as possible and form the normal state.

Finally, a description will be given regarding the processing in the completely-filled-tube-present state where any of the two-coin delivering coin tube 62 and the one-coin delivering coin tubes 63 and 65 is in the completely filled state. In the completely-filled-tube-present state, the coin processing device 1 performs the distribution of inserted coins intensively with respect to the coin tube 6 that is not in the completely filled state and performs the delivery of coins such that the number of times of delivering operation becomes the minimum, basically. However, when there are the plurality of patterns in which the number of times of delivering operation becomes the minimum, the delivery from the coin tube 6 in the completely filled state is preferentially selected among the plurality of patterns.

According to the above-described configuration, it is possible to increase the period in which the delivery is performed simultaneously from the two-coin delivering coin tube 62 and the one-coin delivering coin tubes 63 and 65.

Although the description has been given regarding the determination on the coin tube 6 as the distribution destination of inserted coins and the determination on the coin tube 6 to perform the delivery of coins in the coin processing device 1 as above, similar consideration is necessary even when a worker who performs replenishment of change replenishes the change as well as the distribution of coins according to the coin processing device 1. That is, when the worker performs the replenishment of change, it is necessary for the worker to replenish coins until a state is formed where the empty switch 11 does not detect that the housed coins become the predetermined number or less in the 100W one-coin delivering tubes 63 and 65 such that the change-shortage state is not formed. In general, however, it is difficult for the worker to understand how many coins to be replenished to form the state where the empty switch 11 does not detect that the housed coins become the predetermined number or less. Therefore, each of the coin tubes 6 is provided with an empty-switch-state display LED 12 serving as a display means to cause the state of the empty switch 11 to be displayed in the coin processing device 1. The worker can confirm the detection state of the empty switch 11 using this display means.

In addition, it is assumed that there is a case where it is difficult to use the delivery from the two-coin delivering coin tube 62 such as a case where price of a product sold by the vending machine or the like in which the coin processing device 1 is mounted is only 900 won. Therefore, the worker can manually switch setting in which the two-coin delivering coin tube 62 is used and setting in which the two-coin delivering coin tube 62 is not used, alternately, in the coin processing device 1. In the setting in which the two-coin delivering coin tube 62 is not used, the coin processing device 1 does not perform the distribution of coins to the two-coin delivering coin tube 62 and the delivery of coins from the two-coin delivering coin tube 62. Further, automatic setting in which it is set such that the setting in which the two-coin delivering coin tube 62 is used and the setting in which the two-coin delivering coin tube 62 is not used are automatically performed is possible in the coin processing device 1. In this self-working setting, the coin processing device 1 first operates under the setting in which the two-coin delivering coin tube 62 is not used after power is turned on, and thereafter, is switched to the setting in which the two-coin delivering coin tube 62 is used if receiving a delivery command of two or more coins for change at least once. According to the above-described configuration, the coin processing device 1 can deal even with the case of the product price setting in which it is difficult to use the two-coin delivering coin tube 62.

Further, it is possible to configure a coin delivering device 3 by excluding the coin identification means 4 and the coin distribution means 5, which form the coin sorting device 2, from the coin processing device 1. FIG. 12 is a block diagram of the coin delivering device 3, and FIG. 13 is a schematic view of the coin delivering device 3 and schematically illustrates a cross-section of the coin delivering device 3.

A process of delivering coins in the coin delivering device 3 is basically the same as the process of delivering coins in the coin processing device 1. However, the coin delivering device 3 is different from the coin processing device 1 in terms that the insertion of coins is not performed, and thus, becomes the same process that of the coin processing device 1 when a value of the replenishment rate H of the 100 won coins is set to zero. In addition, it is enough if the coin delivering device 3 includes the delivery use rate Ud of the two-coin delivering coin tube 62, which is the variable indicating the record of delivery of the 100 won coins from the two-coin delivering coin tube 62, and the delivery use rate Us of the one-coin delivering coin tubes 63 and 65, which is the variable indicating the record of delivery of the 100 won coins from the one-coin delivering coin tubes 63 and 65, as the variables forming the location information and the replenishment rate H of the 100 won coins and the distribution rate Sd to the two-coin delivering coin tube 62 are unnecessary. In addition, one corresponding to the number of times of monitored sale N in the coin processing device 1 is referred to as a number of times of monitored delivery N in the coin delivering device 3, and one corresponding to the number of times of predicted sale Nd or Ns is referred to as a number of times of predicted delivery Nd or Ns.

The coin delivering device 3 performs the delivery of coins such that the number of times of delivering operation becomes the minimum in the normal state where the coins for change are sufficiently housed in the one-coin delivering coin tubes 63 and 65. When there are a plurality of patterns in which the number of times of delivering operation becomes the minimum, a delivery pattern in which a smaller value between the number of times of predicted delivery Nd of the two-coin delivering coin tube 62 and the number of times of predicted delivery Ns of the one-coin delivering coin tubes 63 and 65 becomes the largest is selected among the plurality of patterns. On the other hand, in the change-shortage state where the coins for change are not sufficiently housed in the one-coin delivering coin tubes 63 and 65, the coin delivering device 3 performs the delivery of coins from the two-coin delivering coin tube 62 if possible even though the number of times of delivering operation is increased.

Here, the number of times of predicted delivery Nd until the coins for change housed in the two-coin delivering coin tube 62 are used up can be calculated approximately from a relational expression of $Nd=Id/(2\times Ud)$, and the number of times of predicted delivery Ns until the coins for change housed in the one-coin delivering coin tubes 63 and 65 are used up can be calculated approximately from a relational expression of $Ns=Is/Us$. It is possible to calculate the numbers of times of predicted delivery Nd and Ns in the case of selecting the respective delivery patterns by substituting the delivery use rate Ud of the two-coin delivering coin tube and the delivery use rate Us of the one-coin delivering coin tube, after delivery in a case where the delivery is performed by selecting each delivery pattern, in the relational expression.

According to the above-described configuration, it is possible to increase the period in which the delivery is performed simultaneously from the two-coin delivering coin tube 62 and the one-coin delivering coin tubes 63 and 65.

Next, a description will be given regarding a flow of processing to be performed in the above-described coin processing device 1 according to the embodiment of the present invention.

FIG. 3 is a flowchart illustrating a flow of operation of the coin processing device 1 according to the embodiment of the present invention. When power is turned on, the coin processing device 1 first performs initial operation (S101) and performs a process of calculating the target number Xd or Xs based on the location information (S102). Thereafter, the coin processing device 1 is turned into a standby state, and performs the distribution process (S103) when detecting the insertion of coins, performs the delivery process (S104) when receiving the refund command from the main control 13 of the vending machine or the like, and performs the inserted money clearing process (S105) when receiving the inserted money clearing command from the main control 13 of the vending machine or the like.

FIG. 4 is a flowchart illustrating a flow of the distribution process (S103) of the coin processing device 1 according to the embodiment of the present invention. In the distribution process (S103), the coin processing device 1 performs a denomination determination process (S202) when detecting the insertion of coins in the standby state (S201), performs a 500W distribution process (S204) when it is determined that the inserted coin is the 500 won coin (S203), performs the 100W distribution process (S206) when it is determined that the inserted coin is the 100 won coin (S205), and performs a 50W distribution process (S208) when it is determined that the inserted coin is the 50 won coin (S207). Finally, the coin processing device 1 performs an addition process by updating the increase-and-decrease counter 91 and the delivering possible number 92 according to the number of distributed coins (S209).

FIG. 5 is a flowchart illustrating a flow of the 500W distribution process (S204) of the coin processing device 1 according to the embodiment of the present invention. In the 500W distribution process (S204), the coin processing device 1 determines whether the 500W tube 61 is in the completely filled state (S301), and distributes the inserted coin to a safe (S303) when it is determined to be the completely filled state and distributes the inserted coin to the 500W tube 61 when it is determined not to be the completely filled state (S302). The 50W distribution process (S208) is the same as the 500W distribution process.

FIG. 6 is a flowchart illustrating a flow of the 100W distribution process (S206) of the coin processing device 1 according to the embodiment of the present invention.

In the 100W distribution process (S206), the coin processing device 1 first determines whether all the 100W tubes (the 100W two-coin delivering tube 62, the 100W one-coin delivering tube A63, and the 100W one-coin delivering tube B65) are in the completely filled state (S401). When all the 100W tubes 62, 63 and 65 are in the completely filled state, the inserted coin is distributed to the safe (S405). When it is determined not to be in the completely filled state, it is determined whether any of the 100W tubes (the 100W two-coin delivering tube 62, the 100W one-coin delivering tube A63, and the 100W one-coin delivering tube B65) is in the completely filled state (S402). When any of the 100W tubes 62, 63 and 65 is in the completely filled state, the inserted coin is distributed to one of the 100W tubes 62, 63 and 65 that is not in the completely filled state. When none of the 100W tubes 62, 63 and 65 is in the completely filled state, it is determined whether each coin housing number of the 100W one-coin delivering tubes (the 100W one-coin delivering tube A63, the 100W one-coin delivering tube B65) is sufficient (S403).

When each coin housing number of the 100W one-coin delivering tubes 63 and 65 is sufficient (the normal state), the coin processing device 1 distributes the inserted coin to one of the 100W tubes 62, 63 and 65 that has been selected based on the location information 94 (S404). This distribution based on the location information 94 is performed such that the inserted coins are distributed to the corresponding tube among the one-coin delivering coin tubes 62, 63 and 65 until reaching the distribution target number Xd or Xs. After reaching the distribution target number Xd or Xs, the inserted coins are distributed alternately to the two-coin delivering coin tube 62 and the one-coin delivering coin tubes 63 and 65, the coins are distributed according to a specific pattern substantially proportional to the ideal distribution rate Ideal-Sd to the two-coin delivering coin tube 62, or all the inserted coins are distributed to the other coin tube.

Further, when each coin housing number of the 100W one-coin delivering tubes 63 and 65 is not sufficient (the change-shortage state), the coin processing device 1 distributes the inserted coins to a tube with a larger delivering possible number between the two 100W one-coin delivering tubes 63 and 65 (S407).

As described above, the determination on whether each coin housing number of the 100W one-coin delivering tubes 63 and 65 is sufficient is performed based on the output of the empty switch 11. When the empty switch 11 has not detected that the number of housed coins becomes the predetermined number or less in any of the 100W one-coin delivering tube A63 or the 100W one-coin delivering tube B65, it is determined that each coin housing number of the 100W one-coin delivering tubes 63 and 65 is sufficient. When the empty switch 11 has detected that the number of housed coins becomes the predetermined number or less in both the 100W one-coin delivering tube A63 and the 100W one-coin delivering tube B65, it is determined that each coin housing number of the 100W one-coin delivering tubes 63 and 65 is not sufficient.

FIG. 7 is a flowchart illustrating a flow of the delivery process (S104) of the coin processing device 1 according to the embodiment of the present invention. The coin processing device 1 starts the delivery process when receiving the refund command from the main control 13 of the vending machine or the like. The content of the refund command includes denominations of the coins to be delivered and the delivery predetermined number. In the delivery process (S104), the coin processing device 1 sets the remaining delivery predetermined number 93 (S502) when receiving the refund command from the main control 13 of the vending machine or the like (S501), and determines whether the change for the refund command is held with reference to the delivering possible number 92 (S503). The coin processing device 1 ends the delivery process when the change for the refund command is not held, and performs a delivering tube determination process (S504) when the change for the refund command is held. In the delivering tube determination process, the coin tube 6 to perform the delivery of coins in the next one-time delivering operation (operation corresponding to one round trip of pulling out and return of the payout slide) is determined. Next, the coin processing device 1 performs the one-time delivering operation (operation corresponding to one round trip of pulling out and return of the payout slide) and delivers coins from the coin tube 6 that has been determined to perform the delivery in the delivering tube determination process (S505). Next, the coin processing device 1 performs a subtraction process by updating the increase-and-decrease counter 91 and the delivering possible number 92 according to the number of delivered coins (S506). Next, the coin processing device 1 determines whether the entire delivery has been ended (S507) and ends the delivery process (S104) upon sequentially performing a process of updating the location information (S508) and a process of calculating the target number Xd or Xs (S509) when the entire delivery has been ended. When the entire delivery has not been ended, the delivering tube determination process is performed on the remaining predetermined coins that are to be delivered (S504). Thereafter, the same processing is repeated.

FIG. 8 is a flowchart illustrating a flow of the delivering tube determination process (S504) of the coin processing device 1 according to the embodiment of the present invention. In the delivering tube determination process (S504), the coin processing device 1 sequentially performs a 500W delivering tube determination process (S510) to determine the coin tube 6 for the delivery of the 500 won coin, a 100W delivering tube determination process (S511) to determine the coin tube 6 for the delivery of the 100 won coin, and a 50W delivering tube determination process (S512) to determine the coin tube 6 for the delivery of the 50 won coin.

FIG. 9 is a flowchart illustrating a flow of the 500W (50W) delivering tube determination process (S510) of the coin processing device according to the embodiment of the present invention. In the 500W delivering tube determination process (S510), the coin processing device 1 first determines whether the remaining delivery predetermined number 93 of the 500 won coins is zero (S601). The coin processing device 1 ends the 500W delivering tube determination process when the remaining delivery predetermined number 93 of the 500 won coins is zero, and determines the 500W tube 61 as the coin tube 6 for delivery in the next one-time delivering operation (S602) when the remaining delivery predetermined number 93 of the 500 won coins is not zero. Thereafter, the coin processing device 1 updates a value of the remaining delivery predetermined number 93 of the 500 won coins by subtracting one form the previous value (S603) and ends the 500W delivering tube determination process. The 50W delivering tube determination process (S512) is the same as the 500W delivering tube determination process.

FIG. 10 is a flowchart illustrating a flow of the 100W delivering tube determination process (S511) of the coin processing device 1 according to the embodiment of the present invention.

In the 100W delivering tube determination process (S511), the coin processing device 1 first determined whether the remaining delivery predetermined number 93 of the 100 won coins is zero (S701). The coin processing device 1 ends the 100W delivering tube determination process (S511) when the remaining delivery predetermined number 93 of the 100 won coins is zero, and determines whether any of the 100W tubes (the 100W two-coin delivering tube 62, the 100W one-coin delivering tube A63, and the 100W one-coin delivering tube B65) is in the completely filled state (S702) when the remaining delivery predetermined number 93 of the 100 won coins is not zero.

When any of the 100W tubes 62, 63 and 65 is in the completely filled state, the one of the 100W tubes 62, 63 and 65 that is in the completely filled state is preferentially determined as the coin tube 6 for delivery in the next one-time delivering operation (S706). In the delivery that is performed preferentially with the one of the 100W tubes 62, 63 and 65 that is in the completely filled state, the delivery is performed basically such that the number of times of delivering operation becomes the minimum. However, when there are a plurality of patterns in which the number of times of delivering operation becomes the minimum, the delivery from one of the tubes 62, 63 and 65 that is in the completely filled state is preferentially selected among the plurality of patterns. When none of the 100W tubes 62, 63 and 65 is in the completely filled state, it is determined whether each coin housing number of the 100W one-coin delivering tubes (the 100W one-coin delivering tube A63 and the 100W one-coin delivering tube B65) is sufficient (S703).

The coin processing device 1 determines one of the 100W tubes 62, 63 and 65 that has been selected based on the location information 94 as the coin tube 6 for delivery in the next one-time delivering operation (S704) when each coin housing number of the 100W one-coin delivering tubes 63 and 65 is sufficient (the normal state), and determines the coin tube 6 for delivery in the next one-time delivering operation such that the delivery is performed from the 100W two-coin delivering tube 62 if possible (S707) when each coin housing number of the 100W one-coin delivering tubes 63 and 65 is not sufficient (the change-shortage state). The coin processing device 1 performs the determination on the coin tube 6 for delivery, which is performed based on the location information 94 such that the number of times of delivering operation becomes the minimum in regard to the delivery of coins. When there are a plurality of patterns in which the number of times of delivering operation becomes the minimum, a delivery pattern in which a smaller value between the number of times of predicted sale Nd of the two-coin delivering coin tube 62, and the number of times of predicted sale Ns of the one-coin delivering coin tubes 63 and 65 becomes the largest is selected among the plurality of patterns.

Further, a process of updating the remaining delivery predetermined number (S705) is finally performed, thereby ending the 100W delivering tube determination process (S511).

Incidentally, the determination on whether each coin housing number of the 100W one-coin delivering tubes 63 and 65 is sufficient is performed based on the output of the empty switch 11 as described above. When the empty switch 11 has not detected that the number of housed coins becomes the predetermined number or less in any of the 100W one-coin delivering tube A63 or the 100W one-coin delivering tube B65, it is determined that each coin housing number of the 100W one-coin delivering tubes 63 and 65 is sufficient. When the empty switch 11 has detected that the number of housed coins becomes the predetermined number or less in both the 100W one-coin delivering tube A63 and the 100W one-coin delivering tube B65, it is determined that each coin housing number of the 100W one-coin delivering tubes 63 and 65 is not sufficient.

FIG. 11 is a flowchart illustrating a flow of the inserted money clearing process (S105) of the coin processing device 1 according to the embodiment of the present invention. The coin processing device 1 starts the inserted money clearing process (S105) when receiving the inserted money clearing command from the main control 13 of the vending machine or the like. In the inserted money clearing process (S105), when receiving the inserted money clearing command from the main control 13 of the vending machine or the like (S801), the coin processing device 1 sequentially performs updating the location information (S802) and a calculation process of the target number Xd or Xs based on the location information (S803), and then, ends the inserted money clearing process (S105).

According to the coin delivering device 1 of the above-described embodiment, it is possible to increase the speed of the process of delivering coins, and further, it is possible to maintain the delivery performance increased in speed for a long time.

Although one of the embodiments of the present invention has been described as above, the coin processing device of the present invention is not limited to the embodiment. The coin processing device 1 according to the above-described embodiment includes the two one-coin delivering coin tubes, but may include one, or three or more one-coin delivering coin tubes. In addition, the above-described method of calculating the number of times of predicted sale Nd or Ns, the ideal distribution rate Ideal-Sd, and the target number Xd or Xs is mere an example of conceivable calculation methods, and the present invention is not limited to the above-described calculation method. In addition, the coin processing device 1 according to the above-described embodiment uses the location information in order to determine the coin tube for both the distribution of inserted coins and the delivery of coins, but may use the location information only for any one of the distribution of inserted coins and the delivery of coins.

REFERENCE SIGNS LIST 1 coin processing device
2 coin sorting device
3 coin delivering device
4 coin identification means
5 coin distribution means
6 coin tube
61 500W tube
62 100W two-coin delivering tube
63 100W one-coin delivering tube A
64 50W tube
65 100W one-coin delivering tube B
7 coin delivery means
8 calculation means
9 storage means
91 increase-and-decrease counter 92 delivering possible number
93 remaining delivery predetermined number
94 location information
10 completely-filled-state detection switch
11 empty switch
12 empty-switch-state display LED
13 main control of vending machine or the like
C coin

The invention claimed is:

1. A coin processing device comprising:
 a coin identification means that identifies a denomination of inserted coins;
 a coin distribution means that distributes the coins identified by the coin identification means for each denomination;
 a plurality of coin tubes that house the coins distributed by the coin distribution means for each denomination;
 a coin delivery means that delivers the coins housed in the coin tubes by delivering operation of pulling out the coins using a payout slide;
 a two-coin delivering coin tube from which two coins are pulled out during one time of the delivering operation and a one-coin delivering coin tube from which one coin is pulled out during one time of the delivering operation for a specific denomination; and
 a location information storage means that is a means for storing location information which includes a variable indicating a frequency of insertion of coins of the specific denomination into a device main body, variables indicating records of distribution of the coins of the specific denomination to the two-coin delivering coin tube and the one-coin delivering coin tube, and variables indicating records of delivery of the coins of the specific denomination from the two-coin delivering coin tube and the one-coin delivering coin tube,
 wherein the location information is used for at least any one of determination on the coin tube when the coin distribution means distributes the coins of the specific denomination and determination on the coin tube when the coin delivery means delivers the coins of the specific denomination.

2. The coin processing device according to claim 1, wherein
 in a normal state where a coin housing number of the one-coin delivering coin tube is sufficient,
 the coin distribution means distributes the inserted coins of the specific denomination to the coin tube that is selected such that a smaller value between a number of times of sales of the two-coin delivering coin tube calculated based on the location information and a number of times of sales of the one-coin delivering coin tubes calculated based on the location information becomes the largest.

3. The coin processing device according to claim 2, comprising
 a coin detection means that detects that a coin housing number of each of the coin tubes becomes a predetermined number or less,
 wherein it is determined as the normal state when the coin detection means does not detect that the coin housing number becomes the predetermined number or less in one or more of the one-coin delivering coin tubes.

4. The coin processing device according to claim 1, wherein
 in a normal state where a coin housing number of the one-coin delivering coin tube is sufficient,
 the coin delivery means delivers the coins of the specific denomination from the coin tube selected such that a number of times of the delivering operation becomes a minimum, and delivers the coins according to a pattern selected such that a smaller value between a number of times of sales of the two-coin delivering coin tube calculated based on the location information and a number of times of sales of the one-coin delivering coin tubes calculated based on the location information becomes the largest when there are a plurality of patterns in which the number of times of the delivering operation becomes the minimum.

5. The coin processing device according to claim 4, comprising
 a coin detection means that detects that a coin housing number of each of the coin tubes becomes a predetermined number or less,
 wherein it is determined as the normal state when the coin detection means does not detect that the coin housing number becomes the predetermined number or less in one or more of the one-coin delivering coin tubes.

6. A coin delivering device comprising:
 a plurality of coin tubes that house coins for each denomination;
 a coin delivery means that delivers the coins housed in the coin tubes by delivering operation of pulling out the coins using a payout slide;
 a two-coin delivering coin tube from which two coins are pulled out during one time of the delivering operation and a one-coin delivering coin tube from which one coin is pulled out during one time of the delivering operation for a specific denomination; and
 a location information storage means that is a means for storing location information which includes at least variables indicating records of delivery of the coins of the specific denomination from the two-coin delivering coin tube and the one-coin delivering coin tube,
 wherein the location information is used to determine the coin tube when the coin delivery means delivers the coins of the specific denomination.

* * * * *